United States Patent
Broadbent et al.

(10) Patent No.: US 12,485,988 B2
(45) Date of Patent: Dec. 2, 2025

(54) CARGO PACK FOR ATTACHMENT TO A BICYCLE

(71) Applicant: TAILFIN LIMITED, Bristol (GB)

(72) Inventors: Nicholas Broadbent, North Somerset (GB); Robert Phillips, Bristol (GB); Olivia Cowley, Somerset (GB)

(73) Assignee: TAILFIN LIMITED, Bristol (GB)

( * ) Notice: Subject to any disclaimer, the term of this patent is extended or adjusted under 35 U.S.C. 154(b) by 324 days.

(21) Appl. No.: 18/173,872

(22) Filed: Feb. 24, 2023

(65) Prior Publication Data

US 2023/0264773 A1    Aug. 24, 2023

(30) Foreign Application Priority Data

Feb. 24, 2022 (GB) ........................... 2202565
Apr. 14, 2022 (GB) ........................... 2205536
Jul. 18, 2022 (GB) ........................... 2210528

(51) Int. Cl.
*B62J 9/22* (2020.01)
*B62J 9/27* (2020.01)

(52) U.S. Cl.
CPC .. *B62J 9/22* (2020.02); *B62J 9/27* (2020.02)

(58) Field of Classification Search
CPC .. A45C 13/04; A45C 13/36; B62J 7/00; B62J 9/00; B62J 9/20; B62J 9/22; B62J 9/23; B62J 9/24; B62J 9/25; B62J 9/26; B62J 9/27; B62J 9/40
USPC ............ 224/425, 426; 383/119, 33–34.1, 46
See application file for complete search history.

(56) References Cited

U.S. PATENT DOCUMENTS

| 1,556,352 A | * | 10/1925 | Ritter ........................ A45C 3/06 |
| | | | 383/61.3 |
| 5,110,020 A | | 5/1992 | Uhl |
| 6,244,399 B1 | * | 6/2001 | Birkestrand ............. A45C 5/14 |
| | | | 190/114 |
| 2013/0087424 A1 | | 4/2013 | Pratt |
| 2021/0036275 A1 | | 2/2021 | Anderson et al. |

FOREIGN PATENT DOCUMENTS

| DE | 19723886 C1 | * 11/1998 | ................ B62J 9/22 |
| DE | 202016003868 U1 | * 11/2016 | |
| EP | 0157968 A1 | * 10/1985 | |
| GB | 190200087 A | 11/1902 | |

(Continued)

OTHER PUBLICATIONS

DE-19723886-C1 Translation, Theiling T, Nov. 26, 1998 (Year: 1998).*

(Continued)

*Primary Examiner* — Nathan J Newhouse
*Assistant Examiner* — Matthew T Theis
(74) *Attorney, Agent, or Firm* — Perilla Knox & Hildebrandt LLP (57) ABSTRACT

There is described a cargo pack for attachment to a bicycle. The pack comprises an outer casing of a flexible material. The outer casing has: an opening for loading the pack, oppositely disposed side walls, an attachment wall extending between the side walls and intended to lie adjacent a frame member of the bicycle, and elongate internal stiffening elements fitted to each side wall and to the attachment wall. There is also described a method of assembling a cargo pack for attachment to a bicycle.

22 Claims, 6 Drawing Sheets

(56) References Cited

FOREIGN PATENT DOCUMENTS

KR          100953910 B1 * 4/2010
WO       2020225617 A1    11/2020

OTHER PUBLICATIONS

KR-100953910-B1 Translation, Lee, Apr. 22, 2010 (Year: 2010).*
DE-202016003868-U1 Translation, Nov. 3, 2016 (Year: 2016).*
DE-19723886-C1 Translation, Theiling Tobias, Nov. 26, 1998 (Year: 1998).*
Search Report for GB2210528.2; Nov. 15, 2022; 1 pg.

\* cited by examiner

CARGO PACK FOR ATTACHMENT TO A BICYCLE

This invention relates to a cargo pack for attachment to a bicycle.

Bikepacking is a popular leisure pursuit which often involves multi-day touring on a bicycle, often an off-road bicycle such as a mountain bike. Everything needed for touring is carried on the bicycle or by the rider. There is therefore a need for luggage containers, often referred to as cargo packs, which can be attached to the bicycle and can be loaded with equipment such as clothing, sleeping bags and food.

"Soft" packs, such as collapsible bags, are known for this purpose, but pose particular problems. There is a temptation to overstuff such bags, which leads to them bulging beyond their normal dimensions which can cause them to come into contact with moving parts of the bicycle or of the rider. In particular, soft packs attached to frame tubes of the bicycle can project into the path of the rider's legs, and this can be a source of irritation and can even lead to abrasion of the rider's clothing or skin.

According to an aspect there is provided a cargo pack for attachment to a bicycle, the pack comprising: an outer casing of a flexible material. The outer casing has: an opening for loading the pack, oppositely disposed side walls, an attachment wall extending between the side walls and intended to lie adjacent a frame member of the bicycle, and elongate internal stiffening elements fitted to each side wall and to the attachment wall.

The pack may be elongate. The stiffening elements may extend in the lengthwise direction of the pack. The pack may have a generally rectangular cross-section. The outer casing may further comprise a fourth wall disposed opposite the attachment wall. The outer casing may further comprise oppositely disposed end walls closing opposite ends of the pack. At least one of the end walls may be provided with an aperture for the passage of a flexible supply element. The aperture may be provided with a closure. The outer casing may have an internal elongate pocket extending in the lengthwise direction of the pack. The stiffening element may be accommodated in the pocket. The elongate pocket may be provided on at least one wall of the outer casing selected from the side walls and the attachment wall. The pocket may be open at its end adjacent the end wall having the aperture. The respective stiffening element may be passed through the aperture for insertion into the pocket.

The pack may be provided with an additional stiffener in the form of a panel of stiff material extending over the inner surface of at least one of the walls of the outer casing. The pack may have a generally rectangular cross-section. The outer casing may further comprise: a fourth wall disposed opposite the attachment wall, and oppositely disposed end walls closing opposite ends of the pack. The additional stiffener may extend over the inner surfaces of the attachment wall, the fourth wall, and each end wall. The additional stiffener may extend over the inner surface of the attachment wall. The stiffening element fitted to the attachment wall may be secured to the additional stiffener. The attachment wall may be provided with a mounting block for securing the cargo pack to the bicycle. The stiffening element fitted to the attachment wall may be secured to the mounting block. The pack may be provided with an additional stiffener in the form of a panel of stiff material extending over the inner surface of at least one of the walls of the outer casing. The mounting block may be welded to the material of the attachment wall and extend through an opening in the additional stiffener. The mounting block may be secured within the opening by means of a clip which engages the mounting block on the side of the additional stiffener away from the material of the attachment wall. The mounting block may be provided with parallel grooves engaged by complementary parallel rails of the clip. The mounting block may be provided with a recess accommodating an end of the stiffening element fitted to the attachment wall. The attachment wall may be provided with at least two of the mounting blocks. A respective one of the stiffening elements may extend between the or each two adjacent mounting blocks.

A closure means may be provided for closing the opening. The opening may be an elongate opening provided in one of the side walls.

At least one of the stiffening elements may comprise two sections connected by a hinge.

At least one of the stiffening elements may be situated adjacent an edge of the elongate opening and may comprise two sections connected by a hinge.

According to a further aspect there is provided a cargo pack for attachment to a bicycle, the pack comprising: an outer casing of a flexible material, the outer casing being elongate and having a generally rectangular cross-section. The outer case comprises: an opening for loading the pack, oppositely disposed side walls, an attachment wall extending between the side walls and intended to lie adjacent a frame member of the bicycle, a fourth wall disposed opposite the attachment wall, oppositely disposed end walls closing opposite ends of the pack, elongate internal stiffening elements fitted to each side wall and to the attachment wall, an additional stiffener in the form of a panel of stiff material which extends over the inner surfaces of the attachment wall, the fourth wall, and each end wall. The attachment wall is provided with a mounting block for securing the cargo pack to the bicycle, the mounting block being fixed to the material of the attachment wall and extending through an opening in the additional stiffener. The stiffening element fitted to the attachment wall is secured to the mounting block.

The mounting block may be secured within the opening by means of a clip which engages the mounting block on the side of the additional stiffener away from the material of the attachment wall.

According to a further aspect there is provided a method of assembling a cargo pack for attachment to a bicycle, the pack comprising: an elongate outer casing of a flexible material, the outer casing having: an opening for loading the pack, oppositely disposed side walls, an attachment wall extending between the side walls and intended to lie adjacent a frame member of the bicycle, elongate internal stiffening elements fitted to each side wall and to the attachment wall, oppositely disposed end walls closing opposite ends of the pack, an aperture provided in one of the end walls for the passage of a flexible supply element, and an elongate pocket provided on at least one wall of the outer casing selected from the side walls and the attachment wall, and accommodating a respective one of the stiffening elements, the method comprising inserting the respective stiffening element through the aperture into the pocket.

For a better understanding of the present invention, and to show more clearly how it may be carried into effect, reference will now be made, by way of example, to the accompanying drawings, in which.

Figure 1:
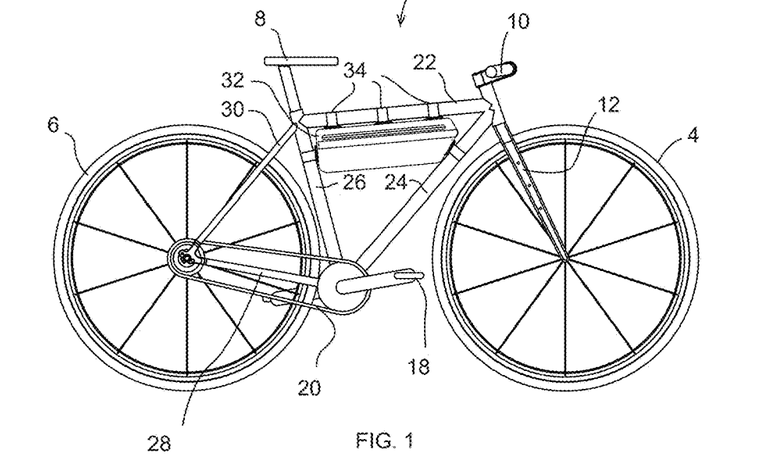
FIG. 1 shows a bicycle provided with a cargo pack fitted to the top tube of the frame of the bicycle.
Figure 2:
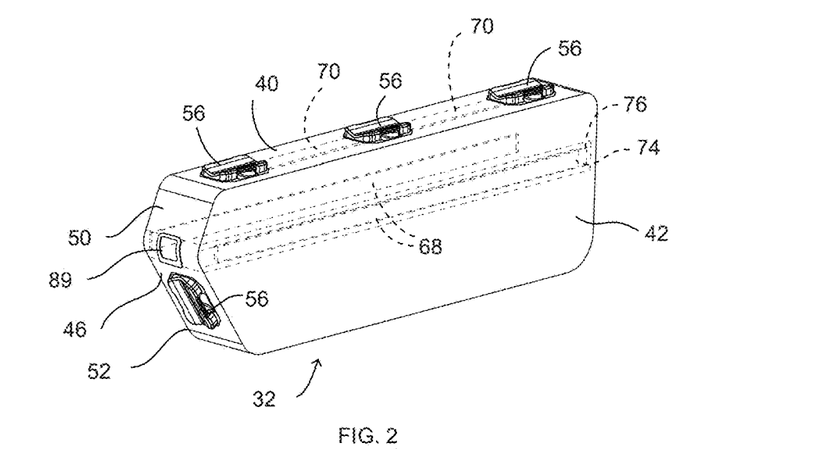
FIG. 2 is a perspective view of the cargo pack.

Although the bicycle shown in FIGS. 1 and 2 is of generic form, the present invention may be applied to cargo packs for use with bicycles suitable for bikepacking such as road and gravel bikes. The cargo packs may, however, also be used with other kinds bicycle such as mountain bikes. Although not shown, the bicycle may be provided with one or more luggage racks, panniers and other accessories for carrying the equipment needed for multi-day touring.

The bike of FIGS. 1 and 2, as is conventional, comprises a frame 2 carrying front and rear wheels 4, 6, a saddle 8 and handlebars 10 for steering the front wheel 4 which is supported by a front fork 12. Pedals 18 drive the rear wheel 6 through a chain 20. In this specification, the expressions "frame" and "frame member" are used in a broad sense to embrace not only the main "diamond" frame which includes a top tube 22, a down tube 24 and a seat post 26, but also other structural members of the bike including, for example, the front fork 12, chain and seat stays 28, 30, and the handlebars 10.

Some frame members of the frame 2 are provided with brazed-in tapped inserts (not shown) to which accessories such as cargo packs can be fixed. The tapped inserts can also be used to secure other accessories such as a water bottle or a pump.

It is sometimes desirable to carry additional cargo packs on the frame at locations where there are no tapped inserts, or where existing tapped inserts are not suitable. For example, as shown in FIG. 1, a cargo pack 32 is carried by the top tube 22, and is secured by straps 34.

FIG. 2 shows the cargo pack 32 in greater detail. The cargo pack 32 is in the form of a bag made from a waterproof textile or sheet material, such as a 420D nylon or other plastics material, which is sufficiently stiff to maintain its shape when unstressed, but which will flex if, for example, baggage items are pressed forcefully into the bag, or if straps or the like are tensioned around the periphery of the bag. As can be appreciated from FIG. 2, the bag 32 has an elongate form, with a generally rectangular or trapezium-shaped cross-section, although it could have other cross-sectional shapes, for example generally circular.

The bag 32 has four sides comprising an attachment wall 40, two side walls 42 (only one visible in FIG. 2), and an outer wall 44 situated opposite the attachment wall 40. The opposite ends of the bag 32 are closed by front and rear end walls 46, 48. The front end wall 46 comprises two sections 50, 52 which are inclined to each other.

Figure 4:
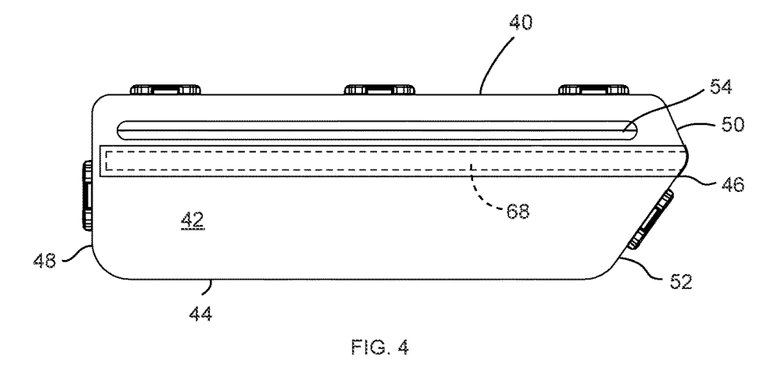
FIG. 4 is a side view of the cargo pack of FIG. 2.
Figure 5:
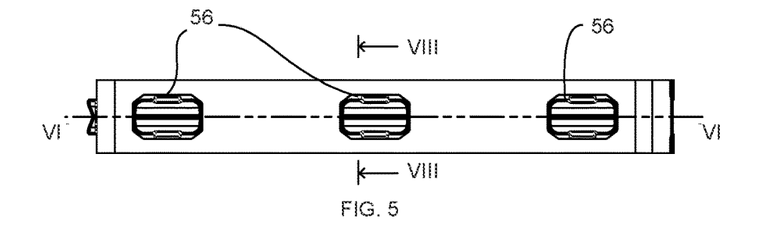
FIG. 5 is a top view of the cargo pack of FIG. 2.
Figure 6:
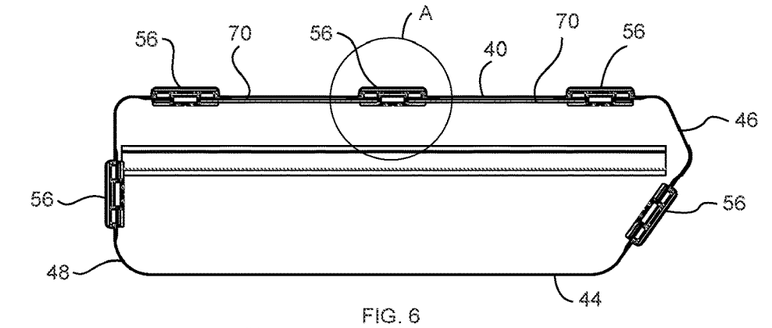
FIG. 6 is a sectional view taken on the line VI-VI in FIG. 5.

As shown in FIG. 4, one of the side walls 42 has an opening extending along the major part of the side wall 42, and closable by means of a zipper 54 or other suitable fastener. Although not shown in FIG. 4, both side walls may have such an opening, and there may also be additional pockets or compartments on the inside of the pack.

The bag is provided with mounting blocks 56 for use in securing the cargo pack 32 to a frame member, such as the top tube 22, of the bike. One or more of the mounting blocks 56 can be fitted with a strap 34, as appropriate, in order to secure the cargo pack.

Figure 3:
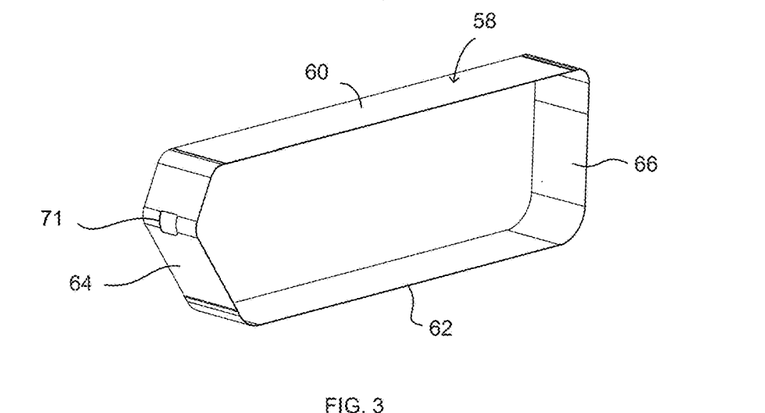
FIG. 3 shows a stiffener of the cargo pack of FIG. 2.

FIG. 3 shows a stiffener 58 which is fitted within the bag in order to provide additional rigidity to maintain the overall shape of the bag 32. The stiffener is made from a suitable rigid material such as a plastics material or aluminium or other lightweight metal or alloy. In the embodiment shown in the drawings, the stiffener 58 is made from a sheet of stiff plastics material such as high-density polyethylene (HDPE). The stiffener 58 is formed into an open structure as shown in FIG. 3, to provide a top panel 60 which, when the stiffener 58 is installed, lies against the attachment wall 40. The stiffener also comprises a bottom panel 62, and end panels 64, 66 which lie respectively against the outer wall 44 and the end walls 46, 48. The stiffener 58 may be heat formed from a flat sheet in order to create the configuration shown in FIG. 3, in which case there will be free edges of the stiffener 58 (not shown) which adjoin each other, for example in the end panel 64 or in the bottom panel 62 at position close to the end panel 64.

As shown in FIG. 2, the end wall 46 is provided with an aperture 89 which extends through both the flexible material of the bag 32 and, as an aperture 71, through the end panel 64 of the stiffener 58. At the outer surface of the bag 32, the aperture 89 is provided with a closure, such as a fabric flap, so that the aperture 89 is closed when not in use, or at least partially closed around components such as an electrical lead or a drinking tube leading from an electrical device or liquid container within the bag 32. Securing means of a suitable form, for example of Velcro®, may be provided to keep the closure closed.

Figure 9:
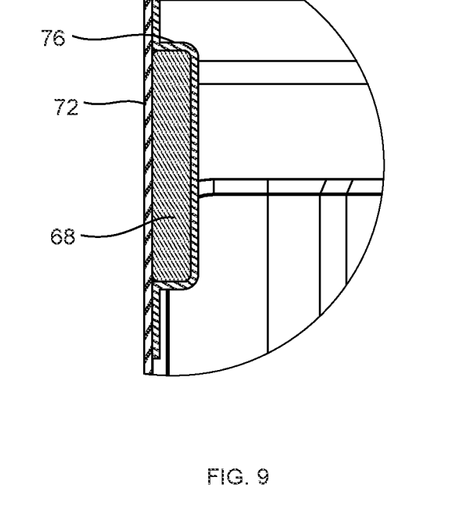
FIG. 9 is an enlarged view of the region B in FIG. 8.

As shown in FIG. 2, the side walls 42 and attachment wall 40 are provided with additional stiffening components in the form of elongate battens 68, 70. The battens 68 are situated on the inner surface of the material of the bag 32, as shown more clearly in FIG. 9. The material of the bag 32 is indicated by reference number 72. Each batten 68 is accommodated in a pocket 74 defined between the bag material 72 and a layer of pocket material 76 which is secured to the bag material 72 by any suitable means. For example, if the bag material 72 and the pocket material 76 are made from thermoplastic materials (and possibly the same material) they can be bonded together by welding, for example radiofrequency (RF) welding. Alternatively, the layers of material can be joined together by adhesive bonding or stitching.

It will be appreciated from FIG. 2 that the side wall battens 68 extend substantially the entire length of the bag 32 and serve to stiffen the side walls 42, which are not overlapped by the stiffener 58. The battens 68, 70 are made from any suitable stiff and lightweight material, for example metal alloy, or a plastics material (such as a fibre reinforced plastics material). In a preferred embodiment, the battens 68, 70 made from a carbon reinforced plastics material. The side wall battens are dimensioned so as to provide the side walls 42 with sufficient stiffness to reduce bulging of the material of the bag 32 outwardly when the bag 32 is packed with cargo, so as to avoid contact of the side walls 42 with the rider's legs. The battens 70 adjacent the attachment wall 40 are dimensioned so as to be of sufficient stiffness to avoid unsightly sagging of the attachment wall 40 between the straps 34 and mounting blocks 56. The battens 68 and 70 have the additional effect of providing greater rigidity to the bag 32 so as to avoid overstressing of the zipper or other closure mechanism which closes the opening 54, when the bag 32 is packed with cargo.

The side wall battens 68 may be fitted within the pockets 74 in a variety of ways, but one particularly advantageous arrangement is for the pockets 74 to be open at the ends nearer the end wall 46. This measure enables the battens 68 to be inserted through the aperture 89 and then passed into the open ends of the pockets 74 until they are fully positioned within the pockets 74.

Figure 7:
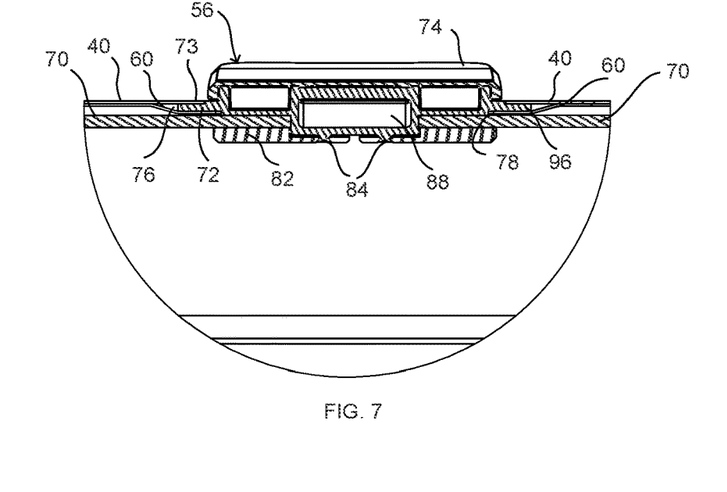
FIG. 7 is an enlarged view of the region A in FIG. 6.
Figure 8:
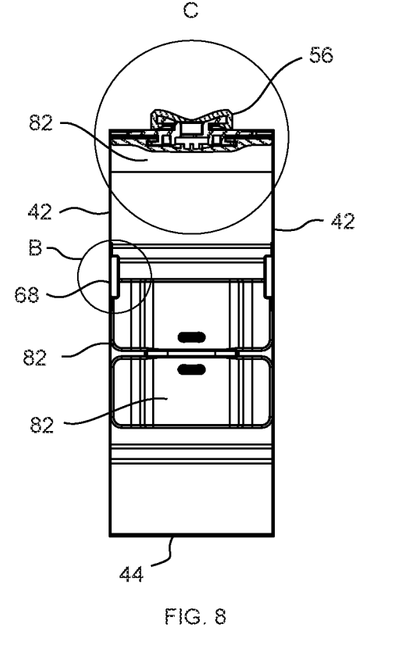
FIG. 8 is a sectional view taken on the line VIII-VIII in FIG. 5.
Figure 10:
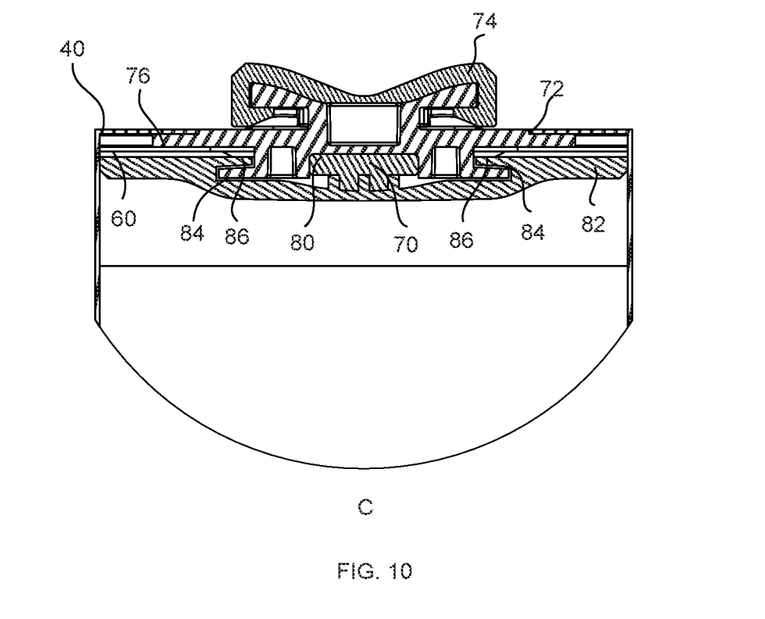
FIG. 10 is an enlarged view of the region C in FIG. 8.

The way in which the battens 70 are installed is shown more clearly in FIGS. 7 and 10. As shown in FIG. 7, the panel 60 of the stiffener 58 lies within the flexible material of the attachment wall 40 of the bag 32. The top panel 60 of the stiffener 58 has a shallow recess 96 which extends in the lengthwise direction of the stiffener 58. Each of the mounting blocks 56 comprises a block body 72 on which is provided a pad 74 of resilient material. The pad 74 serves to contact the selected frame member of the bicycle, for example the top tube 22, in order to achieve strong frictional contact without damaging the frame member.

The block body 72 is fitted within an opening 73 in the material of the attachment wall 40, and a peripheral flange 76 is secured to the surrounding material of the opening 73, for example by RF welding. A corresponding opening 78 is provided in the stiffener 58, and the block body 72 extends through this opening 78 so that the flange 76 is situated between the material of the attachment wall 40 and the portion of the top wall 60 forming the recess 96.

Figure 11:
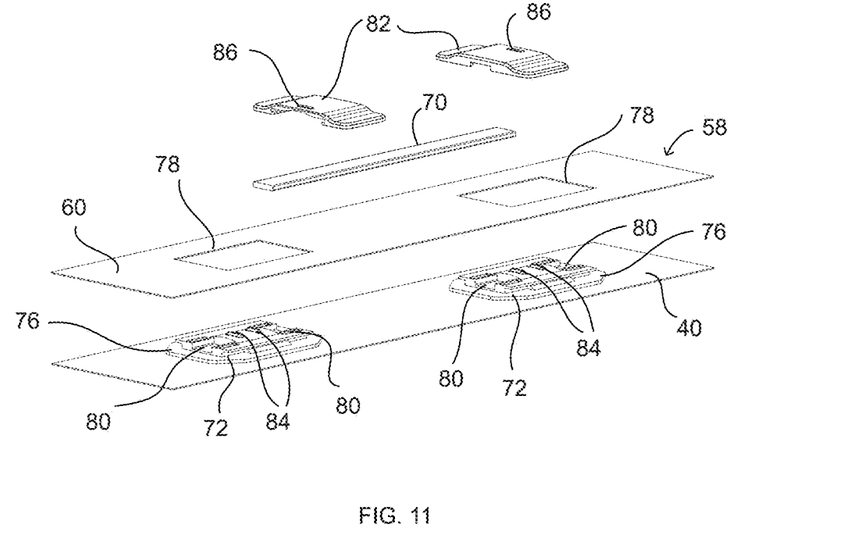
FIG. 11 is an exploded inverted view of components of the pack of FIGS. 2 to 10.
Figure 12:
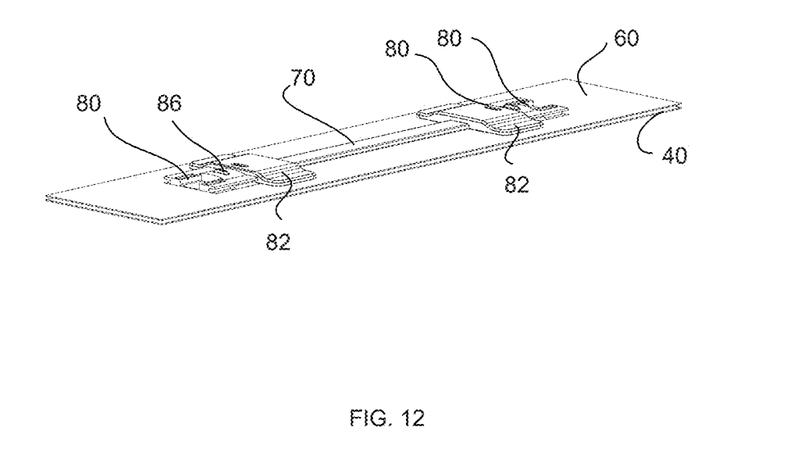
FIG. 12 shows the components shown in FIG. 11 in the assembled condition.

As shown in FIGS. 10, 11 and 12, the block body 72 has recesses 80 in which the battens 70 are accommodated. The battens 70 are retained in the recesses 80 by clips 82, which also serve to retain the mounting blocks 72 in the openings 78 in the top panel 60 of the stiffener 58. For this purpose, each mounting block 72 has a pair of grooves 84 on opposite sides which cooperate with rails 86 of the clips 82. This structure enables the mounting blocks 72, previously welded to the material of the attachment wall 40, to be secured to the stiffener 58 by inserting the mounting blocks 72 through the openings 78 in the stiffener 58 and then sliding the rails 86 of the clips 82 along the grooves 84 into a locked position. Before fitting the clips 82, the ends of the battens 70 are placed in the recesses 80 of the mounting blocks 72, so that engagement of the clips 82 with the mounting blocks 72 traps the ends of the battens 70 in the recesses 80, as shown in FIG. 12. It will be appreciated that FIGS. 11 and 12 show the assembly inverted from the positions shown in FIGS. 7 and 10. Thus, when the assembly is complete, the clips 82 are situated inside the bag 32.

In order to retain the clips securely in the assembled condition, the mounting blocks 72 are provided with detents 84 which engage in corresponding slots 86 in the clips 82.

As shown in FIG. 7, the mounting blocks 72 are formed with strap passages 88 for receiving the straps 34 in order to secure the assembled cargo pack 32 to the appropriate frame member of the bicycle.

Although the above description refers to the securing of the mounting blocks 56 to the attachment wall 40 of the cargo pack 32, it will be appreciated that a similar technique is used to secure the further mounting blocks 56 to the end walls 46, 48 of the pack. The clips 130 have end walls 138 provided with recesses 140 corresponding to the channels 136. The raised regions 126 of the block bodies 54 have detents 142 and the clips 130 have corresponding slots 144.

To assemble the structure shown in FIGS. 2 to 12, the block bodies 72, welded at the openings 73 in the bag material, are offered to the stiffener 58, previously inserted into the bag 32, so that the block bodies 72 pass into the openings 78. The battens 70 are then placed with their ends in the oppositely disposed recesses 80 of the block body 72. The clips 82 are then engaged with the grooves 84 and are displaced in a sliding movement over the block bodies 72 until the detents 84 are engaged in the respective slots 86. Although the detents 84 are employed in the embodiment of FIGS. 2 to 12, they can be dispensed with if the friction between the block bodies 72 and the clips 82 is sufficient to hold the clips 82 in position.

It will be appreciated that the block bodies 72 of FIGS. 2 to 12 are symmetrical about a transverse plane, having the recesses 80 at opposite ends. As will be appreciated from FIGS. 4 to 6, this means that the top panel 60 of the stiffener 58 can receive both of the battens 70, with the central block body 56 (in FIGS. 4 to 6) receiving the ends of the two battens 70, secured by respective clips 82.

Figure 13:
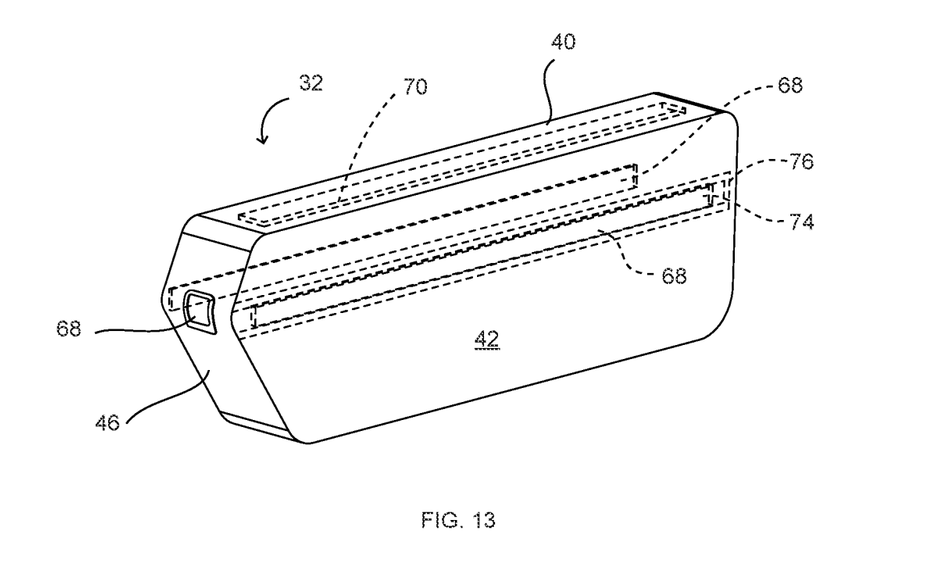
FIGS. 13 to 15 show alternative cargo packs.

FIG. 13 shows a simplified embodiment of the cargo pack which lacks the mounting blocks 56 and the internal stiffener 58. Thus, the cargo pack of FIG. 13 comprises an outer casing of a waterproof textile or sheet material, such as a 420D nylon or other plastics material, which is sufficiently stiff to maintain its shape when unstressed, but which will flex if, for example, baggage items are pressed forcefully into the bag, or if straps or the like are tensioned around the periphery of the bag. The outer casing is provided with elongate stiffening elements in the form of battens 68 and 70, as with the embodiment of FIGS. 2 to 12. The battens 68 are installed in pockets 74, as with the previous embodiment, and the batten 70 fitted to the attachment wall 40 is secured in any suitable manner, for example by direct bonding, or installation in a pocket similar to the pocket 74. As with the previous embodiment, the battens 68 in the side walls 42 can be inserted through the opening 68.

Figure 14:
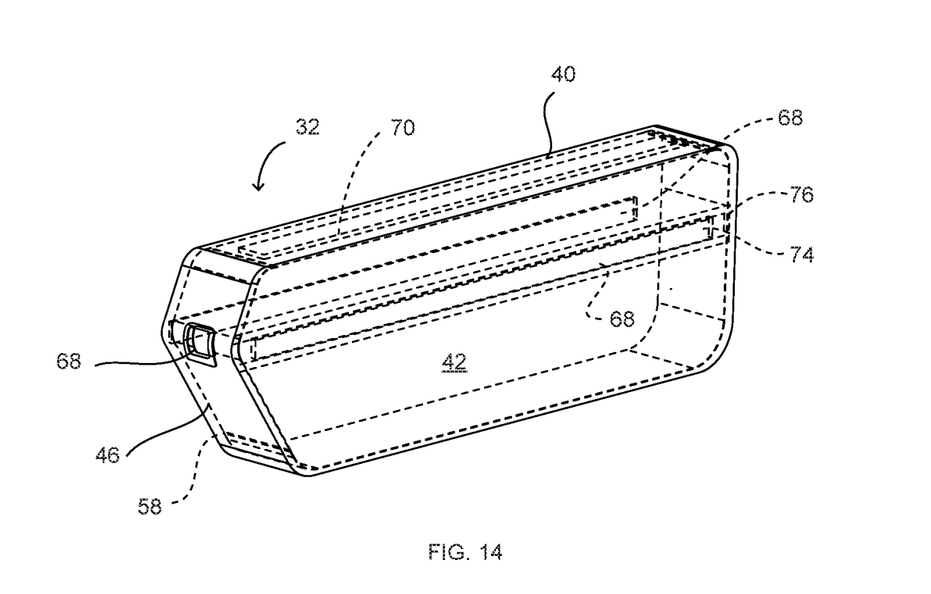

The embodiment of FIG. 14 is similar to that of FIG. 13, except that, in addition to the battens 68 and 70, the pack is additionally stiffened by means of a stiffener 58 as shown in FIG. 3.

Figure 15:
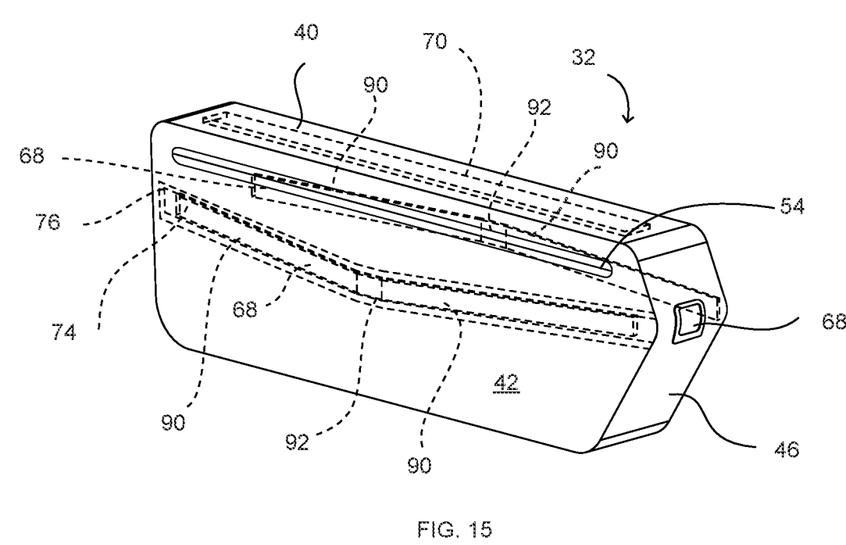

The embodiment of FIG. 15 is similar to that of FIG. 13 except that the battens 68 in the side walls 42 are made up of two sections 90 which are interconnected at a hinge 92. The hinge 92 is shown only diagrammatically in FIG. 15, but may be a pivot pin interconnecting the sections 90, or a living hinge constituted by a reduced thickness region of the batten 68. There may be some resilience at the hinge 92 in order to bias the sections 90 into alignment with each other so that, when unstressed, the bag 32 tends to assume its minimum width configuration.

The hinged battens 68 are situated adjacent the zippered openings 54 so that each batten 68 is a short distance below the lower edge of the opening 54, in the orientation shown in FIG. 15.

The hinge 92 allows the bag to flex outwardly, for example when filling the bag through the zippered opening 54, so that the two edges of the opening 54 can move apart to allow access to the inside of the bag 32.

Although only one hinge 92 is shown, it is possible for there to be two hinges, and three sections 90. Also, the pack shown in FIG. 15 may be provided with a stiffener such as the stiffener 58 of FIG. 3.

The cargo pack of FIG. 13 or 14 can be fitted to the bicycle by any suitable means, for example by means of a strap extending around the top tube 22, or other frame member, and the pack 32 itself. Alternatively, mounting devices such as the mounting blocks 56 can be fitted to the pack 32 in any suitable manner.

For the avoidance of doubt, the present application extends to the subject-matter described in the following numbered paragraphs (referred to as "Para" or "Paras"):

Para 1. A cargo pack for attachment to a bicycle, the pack comprising an outer casing of a flexible material provided with an opening for loading the pack, the outer casing having oppositely disposed side walls and an attachment wall extending between the side walls and intended to lie adjacent a frame member of the bicycle, the outer casing being provided with elongate internal stiffening elements fitted to each side wall and to the attachment wall.

Para 2. A cargo pack as in Para 1, in which the pack is elongate, the stiffening elements extending in the lengthwise direction of the pack.

Para 3. A cargo pack as in Para 1 or 2, in which the pack has a generally rectangular cross-section, the outer casing having a fourth wall disposed opposite the attachment wall.

Para 4. A cargo pack as in Para 2 or 3, in which the outer casing has oppositely disposed end walls closing opposite ends of the pack.

Para 5. A cargo pack as in Para 4, in which at least one of the end walls is provided with an aperture for the passage of a flexible supply element.

Para 6. A cargo pack as in Para 5, in which the aperture is provided with a closure.

Para 7. A cargo pack as in Para 5 or 6, in which at least one of the stiffening elements is accommodated in a respective elongate pocket extending along the respective side or attachment wall.

Para 8. A cargo pack as in Para 7, in which the pocket is open at its end adjacent the end wall having the aperture, whereby the respective stiffening element can be passed through the aperture for insertion into the pocket.

Para 9. A cargo pack as in any one of the preceding Paras, in which the pack is provided with an additional stiffener in the form of a panel of stiff material extending over the inner surface of at least one of the walls of the outer casing.

Para 10. A cargo pack as in Para 9 when appendant to Para is 3 and 4, in which the additional stiffener extends over the inner surfaces of the attachment wall, the fourth wall, and each end wall.

Para 11. A cargo pack as in Para for 9 or 10, in which the stiffening element fitted to the attachment wall is secured to the additional stiffener.

Para 12. A cargo pack as in Para 11, in which the attachment wall is provided with a mounting block for securing the cargo pack to the bicycle, the stiffening element fitted to the attachment wall being secured to the mounting block.

Para 13. A cargo pack as in Para 12, in which the mounting block is welded to the material of the attachment wall and extends through an opening in the additional stiffener.

Para 14. A cargo pack as in Para 13, in which the mounting block is secured within the opening by means of a clip which engages the mounting block on the side of the additional stiffener away from the material of the attachment wall.

Para 15. A cargo pack as in Para 14, in which the mounting block is provided with parallel grooves engaged by complementary parallel rails of the clip.

Para 16. A cargo pack as in Para 14 or 15, in which the mounting block is provided with a recess accommodating an end of the stiffening element fitted to the attachment wall.

Para 17. A cargo pack as in Para 16, in which the attachment wall is provided with at least two of the mounting blocks, a respective one of the stiffening elements extending between the or each two adjacent mounting blocks.

Para 18. A cargo pack as in any one of the preceding Paras, in which a closure means is provided for closing the opening.

Para 19. A cargo pack as in any one of the preceding Paras, in which the opening is an elongate opening provided in one of the side walls.

Para 20. A cargo pack as in any one of the preceding Paras, in which at least one of the stiffening elements comprises two sections connected by a hinge.

Para 21. A cargo pack as in Para 20 when appendant to Para 19, in which the stiffening element comprising the two sections is situated adjacent an edge of the elongate opening.

Para 22. A method of assembling a cargo pack as in Para 8, the method comprising inserting the respective stiffening element through the aperture into the pocket.

Para 23. A frame mounted bicycle accessory comprising a collapsible receptacle provided with a mounting block secured to the receptacle and having a contact portion situated externally of the receptacle for contact with a frame member of a bicycle, the mounting block being provided with a strap adapted to extend around the frame member to secure the accessory to the frame member.

Para 24. A bicycle accessory as in Para 23, in which the mounting block comprises a block body and a pad of resilient material fitted to the block body for contact with the frame member.

Para 25. A bicycle accessory as in Para 24, in which the pad is releasably connected to the block body.

Para 26. A bicycle accessory as in Paras 24 or 25, in which the pad has a concave surface for contact with the frame member.

Para 27. A bicycle accessory as in any one of Paras 23 to 26, in which the receptacle has an interior stiffener of rigid material, the mounting block being secured to the stiffener.

Para 28. A bicycle accessory as in Para 27, in which the mounting block is secured to the stiffener by a fastener which extends through the material of the receptacle.

Para 29. A bicycle accessory as in Para 27 or 28, in which the stiffener comprises an elongate element provided along its length with a plurality of attachment features for attachment of the mounting block.

Para 30. A bicycle accessory as in Para 29 when appendant to Para 28, in which the attachment features are tapped holes and the fastener is a screwthreaded fastener engaging one of the tapped holes.

Para 31. A bicycle accessory as in Para 28 or 29, in which the stiffener comprises a peripheral frame, the elongate element extending across the frame.

Para 32. A bicycle accessory as in any one of Paras 27 to 31, in which the stiffener is made from a metallic material.

Para 33. A bicycle accessory as in any one of Paras 27 to 32, in which the stiffener is accommodated in a pocket situated on the inner surface of the material of the receptacle.

Para 34. A bicycle accessory as in Para 33, in which the pocket is defined between a layer of pocket material and the material of the receptacle.

Para 35. A bicycle accessory as in Para 34, in which the pocket material is sealed to the material of the receptacle around at least part of the periphery of the pocket.

Para 36. A bicycle accessory as in any one of Paras 23 to 35, in which the strap is made from an elastic material.

Para 37. A bicycle accessory as in Para 36, in which the strap comprises a head end and a tail end, the head end having an aperture for receiving the tail end, whereby the strap can be formed into a loop extending around the frame member in use.

Para 38. A bicycle accessory as in Para 37, in which the strap is provided with an array of openings between the head end and the tail end, and with a projection which is engageable with a selected one of the openings when the tail end is passed through the aperture to retain the strap in a required looped configuration.

Para 39. A bicycle accessory as in any one of Paras 23 to 38, in which the mounting block defines a strap passage for receiving the strap to retain the strap with respect to the mounting block in a releasable manner.

Para 40. A bicycle accessory as in Para 39, in which the strap passage has a depth sufficient to accommodate a double thickness of the strap.

Para 41. A bicycle accessory as in any Para 40, in which the receptacle has a recess in its external surface, the mounting block being secured to the receptacle in the recess.

Para 42. A bicycle accessory as in Para 41 when appendant to Para 27, in which the stiffener contacts the internal surface of the receptacle and has a profile corresponding to the shape of the recess.

Para 43. A bicycle accessory as in Para 42, in which the mounting block is secured to the receptacle by a fastener which extends through the stiffener and the material of the receptacle whereby the material of the receptacle is secured between the stiffener and the mounting block.

Para 44. A bicycle accessory as in Para 43, in which a clamp engages the stiffener on a surface of the stiffener away from the material of the receptacle, the clamp being secured to the mounting block by the fastener.

Para 45. A bicycle accessory as in Para 40, in which the material of the receptacle has an opening in which the mounting block is situated, the mounting block having a peripheral flange secured to the material of the receptacle around the opening, and a raised portion directed inwardly of the receptacle from the flange, the raised portion projecting into the interior of the receptacle and defining the strap passage.

Para 46. A bicycle accessory as in Para 45, in which the peripheral flange is secured to the material of the receptacle by bonding.

Para 47. A bicycle accessory as in Para 46, in which the raised portion comprises a peripheral rib surrounding the strap passage.

Para 48. A bicycle accessory as in Para 47, in which a patch is secured over the rib to seal the strap passage from the interior of the receptacle.

Para 49. A bicycle accessory as in Para 46, in which the raised portion has a cover panel which seals the strap passage from the interior of the receptacle.

Para 50. A bicycle accessory as in Para 49, in which the cover panel has an arcuate concave surface constituting an inner wall of the strap passage.

Para 51. A bicycle accessory as in Para 40 when appendant to Para 27, in which the mounting block is provided with a raised region which extends through openings in the stiffener and the material of the receptacle, the raised region being engaged by a securing feature situated within the receptacle, for securing the mounting block to the receptacle.

Para 52. A bicycle accessory as in Para 51, in which securing feature comprises a retaining clip.

Para 53. A bicycle accessory as in Para 51 or 52, in which the securing feature is provided with rails which engage parallel grooves provided in the mounting block.

Para 54. A bicycle accessory as in Para 51 or 52, in which the raised region of the mounting block defines the strap passage.

Para 55. A bicycle accessory as in any one of Paras 23 to 54, in which the mounting block is one of at least two spaced apart mounting blocks secured to the receptacle, each mounting block having a respective strap.

Para 56. A bicycle accessory as in Para 55, when appendant to any one of Paras 51 to 54, in which a stiffening baton extends between the spaced apart mounting blocks.

Para 57. A bicycle accessory as in Para 56, in which the baton is located with respect to the mounting blocks by the respective securing features.

Para 58. A bicycle accessory as in Para 57, in which each mounting block is provided with a recess accommodating an end region of the baton, the respective securing features engaging the baton to retain its end regions within the respective recesses.

Para 59. A bicycle accessory as in any one of Paras 23 to 58, in which the receptacle is in the form of a bag of flexible material.

Para 60. A kit of parts for assembly to form a bicycle accessory as in any one of Paras 27 to 35, or any one of Paras 36 to 41 when appendant to any one of Paras 27 to 35, or any one of Paras 42 to 59, the kit comprising:
  a. the receptacle,
  b. the stiffener,
  c. the mounting block,
  d. the fastener, and
  e. the strap.

Para 61. A kit of parts as in Para 60 when appendant to Para 52, further comprising the retaining clip.

Para 62. A kit of parts as in Para 60 when appendant to Para 45, in which the flange of the mounting block is secured to the receptacle.

Para 63. A kit of parts as in any one of Paras 60 to 62 when appendant to Para 24, in which the kit comprises the block body and the pad as separate components.

Para 64. A kit of parts as in any one of Paras 60 to Para 63, in which a plurality of mounting blocks are provided.

Para 65. A kit of parts as in Para 64 when appendant to Para 57, further comprising the baton.

Para 66. A kit of parts as in any one of Paras 60 to 65, in which a plurality of straps of different length are provided.

Para 67. A bicycle provided with an bicycle accessory as in any one of Paras 23 to 59 or assembled from a kit as claimed in any one of Paras 60 to 66, which is mounted on a frame member of the bicycle by means of the or each strap.

The invention claimed is:

1. A cargo pack for attachment to a bicycle, the pack comprising:
  an outer casing of a flexible material, the outer casing having:
    an opening for loading the pack,
    oppositely disposed side walls,
    an attachment wall extending between the side walls and intended to lie adjacent a frame member of the bicycle, and
    elongate internal stiffening elements fitted to each side wall and to the attachment wall;
  a mounting block provided on the attachment wall for securing the cargo pack to the bicycle, the stiffening elements fitted to the attachment wall being secured to the mounting block; and
  an additional stiffener in the form of a panel of stiff material extending over the inner surface of at least one of the walls of the outer casing, wherein the mounting block is welded to the material of the attachment wall and extends through an opening in the additional stiffener.

2. A cargo pack as claimed in claim 1, in which the pack is elongate, the stiffening elements extending in the lengthwise direction of the pack.

3. A cargo pack as claimed in claim 2, in which the outer casing further comprises oppositely disposed end walls closing opposite ends of the pack.

4. A cargo pack as claimed in claim 3, in which at least one of the end walls is provided with an aperture for the passage of a flexible supply element.

5. A cargo pack as claimed in claim 4, in which the aperture is provided with a closure.

6. A cargo pack as claimed in claim 4, in which the outer casing has an internal elongate pocket extending in the lengthwise direction of the pack, the stiffening element being accommodated in the pocket.

7. A cargo pack as claimed in claim 6, in which the elongate pocket is provided on at least one wall of the outer casing selected from the side walls and the attachment wall.

8. A cargo pack as claimed in claim 6, in which the pocket is open at its end adjacent the end wall having the aperture, whereby the respective stiffening element can be passed through the aperture for insertion into the pocket.

9. A cargo pack as claimed in claim 1, in which the pack has a generally rectangular cross-section, the outer casing further comprising a fourth wall disposed opposite the attachment wall.

10. A cargo pack as claimed in claim 1, in which the pack is provided with an additional stiffener in the form of a panel of stiff material extending over the inner surface of at least one of the walls of the outer casing.

11. A cargo pack as claimed in claim 10, in which the pack has a generally rectangular cross-section, the outer casing further comprising:
a fourth wall disposed opposite the attachment wall, and oppositely disposed end walls closing opposite ends of the pack, wherein the additional stiffener extends over the inner surfaces of the attachment wall, the fourth wall, and each end wall.

12. A cargo pack as claimed in claim 10, in which the additional stiffener extends over the inner surface of the attachment wall, wherein the stiffening element fitted to the attachment wall is secured to the additional stiffener.

13. A cargo pack as claimed in claim 1, in which the mounting block is secured within the opening by means of a clip which engages the mounting block on the side of the additional stiffener away from the material of the attachment wall.

14. A cargo pack as claimed in claim 13, in which the mounting block is provided with parallel grooves engaged by complementary parallel rails of the clip.

15. A cargo pack as claimed in claim 1, in which the mounting block is provided with a recess accommodating an end of the stiffening element fitted to the attachment wall.

16. A cargo pack as claimed in claim 15, in which the attachment wall is provided with at least two of the mounting blocks, a respective one of the stiffening elements extending between the or each two adjacent mounting blocks.

17. A cargo pack as claimed in claim 1, in which a closure means is provided for closing the opening.

18. A cargo pack as claimed in claim 1, in which the opening is an elongate opening provided in one of the side walls.

19. A cargo pack as claimed in claim 18, in which at least one of the stiffening elements is situated adjacent an edge of the elongate opening and comprises two sections connected by a hinge.

20. A cargo pack as claimed in claim 1, in which at least one of the stiffening elements comprises two sections connected by a hinge.

21. A cargo pack for attachment to a bicycle, the pack comprising:
an outer casing of a flexible material, the outer casing being elongate and having a generally rectangular cross-section, the outer case comprising:
an opening for loading the pack,
oppositely disposed side walls,
an attachment wall extending between the side walls and intended to lie adjacent a frame member of the bicycle,
a fourth wall disposed opposite the attachment wall,
oppositely disposed end walls closing opposite ends of the pack,
elongate internal stiffening elements fitted to each side wall and to the attachment wall,
an additional stiffener in the form of a panel of stiff material which extends over the inner surfaces of the attachment wall, the fourth wall, and each end wall,
wherein the attachment wall is provided with a mounting block for securing the cargo pack to the bicycle, the mounting block being fixed to the material of the attachment wall and extending through an opening in the additional stiffener, and wherein the stiffening element fitted to the attachment wall is secured to the mounting block.

22. A cargo pack as claimed in claim 21, in which the mounting block is secured within the opening by means of a clip which engages the mounting block on the side of the additional stiffener away from the material of the attachment wall.

* * * * *